(No Model.)
A. OLMSTED.
POTATO DIGGER.
No. 498,522. Patented May 30, 1893.
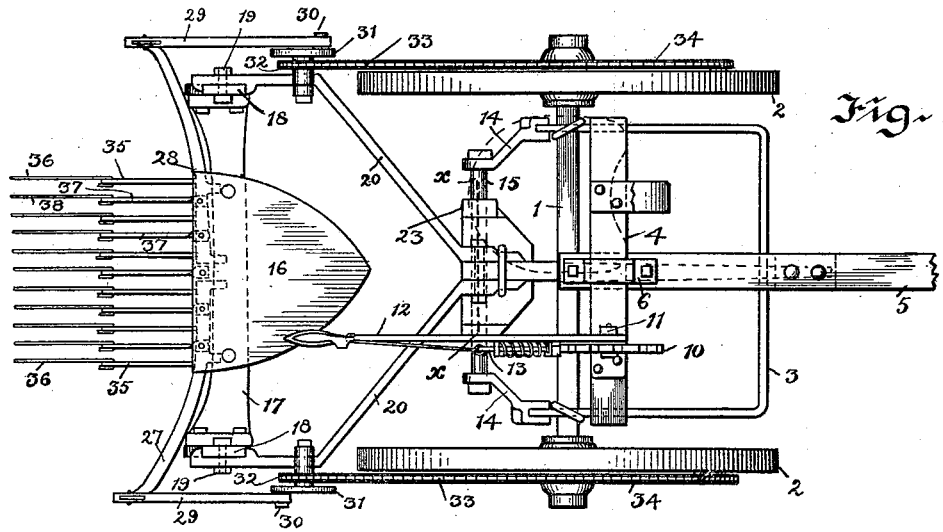
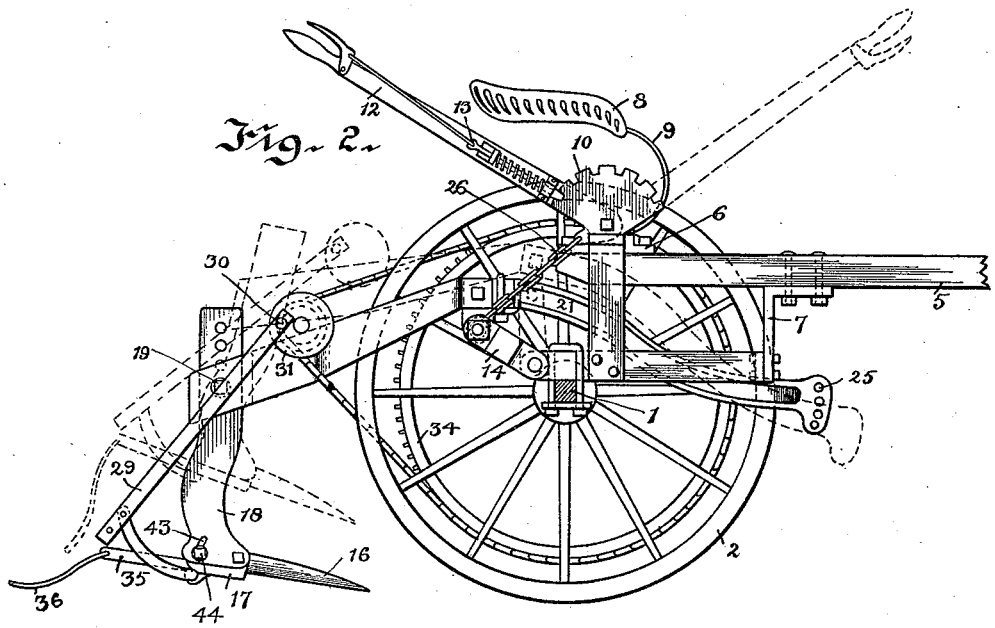
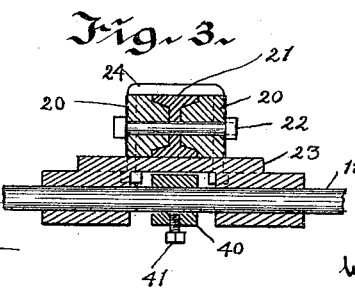
Witnesses
Thomas Grant
Alex J. Stewart
Inventor
Alfred Olmsted
by Church & Church
his Atty

UNITED STATES PATENT OFFICE.

ALFRED OLMSTED, OF BYRON, NEW YORK.

POTATO-DIGGER.

SPECIFICATION forming part of Letters Patent No. 498,522, dated May 30, 1893.

Application filed February 6, 1892. Serial No. 420,581. (No model.)

*To all whom it may concern:*

Be it known that I, ALFRED OLMSTED, a citizen of the United States, and a resident of Byron, in the county of Genesee and State of New York, have invented certain new and useful Improvements in Potato-Diggers; and I do hereby declare the following to be a full, clear, and exact description of the same, reference being had to the accompanying drawings, forming a part of this specification, and to the reference numerals marked thereon.

My present invention has for its object to provide an improved machine for digging potatoes, whereby they will be effectually separated from the earth and left on top of the ground in condition to be readily gathered, and it consists in certain improvements in construction and combinations of parts, all as will be hereinafter fully described and the novel features pointed out in the claims at the end of this specification.

In the accompanying drawings: Figure 1 is a plan view of a machine constructed in accordance with my invention. Fig. 2 is a side elevation of the same with one of the wheels removed; Fig. 3 a sectional view on the line x—x of Fig. 1.

Similar reference numerals in the several figures indicate similar parts.

1 indicates the supporting axle of the machine upon the end of which are journaled supporting wheels 2 and to the upper side of the axle is rigidly secured a frame composed of a forwardly extending portion 3; the sides of which latter are connected by the vertically and horizontally extending part 4 rigidly secured to it.

5 indicates the tongue or pole secured to the part 4 of the frame, by a bracket 6 and to the under side of the tongue is connected a bracket 7 bolted to the portion 3 of the frame, as shown in Fig. 2. A driver's seat 8 is mounted upon a spring support 9 bolted to the part 4 of the frame and also secured to said part is a rack segment 10 and bracket 11 to which latter is pivoted an operating handle 12 for adjusting the depth the shovel or share enters the ground, as will be explained; said handle having the usual spring operated bolt 13 for co-operating with the rack 10. The ends of the part 3 of the frame secured to the axle are extended slightly back of the center of the latter and to said ends are pivoted links 14 slightly bent as shown and passing through the outer ends of said links is a rod or bar 15 upon which the beam of the shovel or share is mounted.

16 indicates the opening share preferably composed of a single plate, bolted, or otherwise secured, to a cross bar 17 supported on the lower ends of standards 18, which latter are adjustably secured by bolts 19 to the rear end of a V-shaped frame constructed of two side pieces 20, extending toward the center of the machine and bolted to the draft bar 21 by a bolt 22, as shown in Fig. 3. This draft bar rests upon plate 23 and is secured to it by a clip 24 and upon its lower side the plate 23 is provided with bearings through which pass the rod 15 supported on the links 14. The forward end of the draft bar rests beneath the part 3 of the frame secured to the axle and its forward end is provided with a series of holes 25 with which the clevis attached to the whiffle-tree engages. The rod 15 is connected by a chain 26 with the lever 12, which normally supports the share and beam when the machine is to be transported, and said lever serves as a means for adjusting the depth to which the share enters the ground.

Pivoted to the rear and slightly below the cross bar 17 are two shafts 27 and 28 provided with outwardly and upwardly curved arms connected by pitmen 29 with wrist pins 30 on wheels 31 mounted in bearings on the upper side of the share frame 20.

Connected with the wheels 31 are sprocket wheels 32 over which pass chains 33 engaging the teeth of large sprocket wheels 34 secured to the supporting wheels 2 of the machine.

The shafts 27 and 28 are provided on their rear sides with fingers 35 projecting backward and slightly above the level of the share 16 and loosely connected to their outer ends are trailing wires or rods 36 and between said fingers, are located corresponding fingers 37 rigidly secured to the bar 17 or the shovel 16, said last mentioned fingers being arranged between the movable fingers on the shaft and also provided with corresponding trailing rods or wires 38.

The rod 15 on which the plate 23 is pivoted, it will be noted, is longer than the width of said plate and the share frame is maintained in central position by a collar 40 mounted on the rod 15 between the bearings of the plate and secured in position by a set screw 41, as shown in Fig. 3. By loosening this collar the share frame can be adjusted laterally within certain limits, it being inadvisable to move the share so far laterally that the chains 33 would be liable to run off the sprocket wheels. As the weight of the shovel frame is back of the rod 15 on which it is pivoted, the forward end of the draft bar will be held against the under side of the frame 3 and the weight of the tongue will be sufficient to counterbalance the share and attached parts, so that the frame 3 will serve in a measure, as a fixed point from which the adjustments of the share are accomplished. When it is desired to adjust the depth to which the share operates, or remove it entirely from the ground as in transporting the machine to and from the field, it is only necessary to operate the hand lever 12, the chain raising the rear of the frame, which turns the links 14, as will be understood.

When the machine is in operation, the wheels will communicate motion through the sprocket, chain, wheels and pitmen to the separator fingers 35 at the rear of the share and these by passing up between the stationary fingers 37 will serve to sift the potatoes from the containing earth and pulverize the latter, which will further be accomplished by the trailing rods 36 and the separated potatoes prevented from being covered again by the earth.

It is desirable to employ two series of separating fingers back of the opening share and to operate them independently as by this means a better separation of the earth and potatoes is secured and even when the machine is turning, one set is always in operation.

The inclination of the share or shovel can be readily accomplished by means of the slot 43 provided in the lower ends of the standards 18 and the securing bolt 44, the forward bolt 46 then serving as a pivot, as shown in Fig. 2, while the vertical adjustment of said standards on the plate 20 is also provided for.

By the employment of a draft bar, which is directly connected to the share and independently (except so far as vertical adjustment is concerned) of the frame on which the supporting wheels are mounted, the latter will not be liable to injury when in operation.

I claim as my invention—

1. The combination with the main frame and the supporting wheels, the share, its frame and the connected draft bar, having means for the direct attachment of the horses, loosely engaging the under side of the main frame, of the links pivoted to the main and share frames, and lifting devices on the main frame for moving the share on the links, substantially as described.

2. The combination with the main frame, the supporting wheels, the links pivoted on the frame and the bar connecting them, of the share frame pivoted on said bar and laterally adjustable thereon, substantially as described.

3. The combination with the main frame, the supporting wheels, the links pivoted thereon, the bar connecting the links, of the plate journaled on the bar, the share frame mounted thereon having the share and the draft bar having means for the direct attachment of the horses extending forward and loosely engaging the under side of the main frame and lifting devices for the share frame, substantially as described.

4. The combination with the axle, the wheels, the main frame composed of the parts 3 and 4 arranged in front of the axle and the tongue connected thereto, of the share, and share frame pivoted in rear of the axle on links connected to the main frame, the draft bar extending beneath the frame forward of the axle and having means for the direct attachment of the horses and lifting devices on the main frame for adjusting the share frame, substantially as described.

5. In a potato-digger, the combination with the wheels, the share or shovel, having a series of stationary rearwardly projecting fingers thereon, of an oscillating shaft arranged beneath the share having a series of movable separating fingers projecting and movable upwardly between the stationary fingers on the share, and means for oscillating said shaft, substantially as described.

6. In a potato digger, the combination with the wheels and the share or shovel, having the rearwardly projecting stationary fingers, of the two oscillating shafts arranged beneath the share, each having fingers projecting in rear thereof and extending between those on the share and connections between said shafts and the wheels for causing their independent oscillation, substantially as described.

7. In a potato digger, the combination with the axle, the supporting wheels having the sprocket wheels thereon, of the share frame embodying the standards cross-bar and share, the two oscillating shafts on the cross-bar having rearwardly projecting fingers, the sprocket wheels on the share frame having the wrist pins, the pitmen connected to the wrist pins and to the oscillating shafts and the chains connecting the sprockets on the supporting wheels with those on the share frame, substantially as described.

8. The combination with the axle, the wheels, the main frame extending forward of the axle, and the tongue connected thereto, of the draft bar extending over the axle and beneath the forward portion of the main frame, the share, the share frame connected to the bar, the links pivoted to the main frame in rear of the axle and below the connection with the share frame whereby the thrust on the links will be longitudinal, and lifting devices on the main frame for adjusting the share frame, substantially as described.

9. In a potato digger, the combination with the share having the stationary fingers projecting to the rear and the trailing rods thereon, of the oscillatory shaft on the share provided with fingers extending between those on the share and having the loose trailing rods, substantially as described.

10. In a potato digger, the combination with the share having the stationary rearwardly projecting fingers provided with loose trailing rods, of the two oscillatory shafts on the share having fingers projecting between those on the share and each provided with the trailing rods connected thereto, substantially as described.

ALFRED OLMSTED.

Witnesses:
W. S. HOUSEL,
G. N. BOWMAN.